United States Patent
Lei

(10) Patent No.: US 10,775,000 B2
(45) Date of Patent: Sep. 15, 2020

(54) AUTOMATIC PRODUCTION PROCESS OF LED BULBS

(71) Applicant: Dongguan Miray E-Tech Co.,Ltd, Dongguan, Guangdong (CN)

(72) Inventor: Jianwen Lei, Guangdong (CN)

(73) Assignee: Dongguan Miray E-Tech Co., Ltd., Dongguan (CN)

( * ) Notice: Subject to any disclaimer, the term of this patent is extended or adjusted under 35 U.S.C. 154(b) by 302 days.

(21) Appl. No.: 16/103,066

(22) Filed: Aug. 14, 2018

(65) Prior Publication Data
US 2020/0011490 A1 Jan. 9, 2020

(30) Foreign Application Priority Data
Jul. 7, 2018 (CN) .......................... 2018 1 0739971

(51) Int. Cl.
*F21K 9/90* (2016.01)
*F21K 9/232* (2016.01)
*F21Y 115/10* (2016.01)
*B23K 101/40* (2006.01)

(52) U.S. Cl.
CPC ................ *F21K 9/90* (2013.01); *F21K 9/232* (2016.08); *B23K 2101/40* (2018.08); *F21Y 2115/10* (2016.08)

(58) Field of Classification Search
CPC ....... B23K 2101/40; F21K 9/232; F21K 9/90; F21Y 2115/10
See application file for complete search history.

(56) References Cited

U.S. PATENT DOCUMENTS

| | | | |
|---|---|---|---|
| 5,848,837 A * | 12/1998 | Gustafson | B64F 1/002 362/235 |
| 9,410,687 B2 * | 8/2016 | Hussell | F21V 21/00 |
| 2017/0202061 A1 * | 7/2017 | Allen | F21K 9/238 |

FOREIGN PATENT DOCUMENTS

| | | | |
|---|---|---|---|
| CN | 101509616 A | * | 8/2009 |
| CN | 103225757 | * | 7/2013 |

* cited by examiner

*Primary Examiner* — Carl J Arbes
(74) *Attorney, Agent, or Firm* — Enshan Hong; VLP Law Group LLP

(57) ABSTRACT

An automatic process of making a LED bulb comprising: automatic manufacturing of a glass core column with a driving chip and a resistor, automatic welding of an LED wick, automatic sealing and venting of a lamp cover and the wick and gas protection, automatic installation of a lamp holder, and automatic optical inspection and packaging. With the automatic process, which is a substitution for the manual production having a high cost labor and which reduces the uncertainty of the quality, continuous all-day production without interruptions is achieved, and the production efficiency and quality are improved.

9 Claims, 3 Drawing Sheets

AUTOMATIC PRODUCTION PROCESS OF LED BULBS

CROSS-REFERENCES TO RELATED APPLICATIONS

This application claims priority from China Patent Application Serial Number 2018/10739971.6, which was filed on Jul. 7, 2018.

BACKGROUND OF THE INVENTION

1. Technical Field

The present invention relates to the technical field of LED bulbs production, in particular to an automatic production process of LED bulbs.

2. Background Art

LED bulbs have the advantages of a high efficiency, saving energy, protecting the environment, etc. With the popularization of LED technology, LED bulbs are now used in many lighting fields to replace traditional incandescent bulbs. An LED bulb is generally assembled from a lamp holder, a lamp cover, an LED wick and an electronic element, and the production of the LED bulb requires many manual processes. The traditional LED bulb production process generally follows the traditional production process of manual welding of an electronic element and an LED filament. Firstly, a core column within an incandescent bulb is preprocessed, and a filament is manually welded to the core column to form a wick; and the wick and a lamp cover are then sealed to manufacture a rough bulb, a driving power supply is manually connected at a rear end of the rough bulb, a lamp holder is manually fixed and installed to form a finished product, and finally, manual optical inspection is conducted. In the prior art, the above-mentioned multiple production processes substantially employ manual operations, and the whole production line requires a lot of manpower, causing a high production cost, a slow manual operation speed and a low production efficiency. Therefore, how to realize fast, efficient and high-quality production of LED bulbs has become a problem to be solved in current LED production lines.

SUMMARY OF THE INVENTION

In view of the problems in the prior art, the present invention provides an automatic production process of LED bulbs.

In order to solve the above-mentioned technical problems, the technical solution used by the present invention is as follows: an automatic production process of LED bulbs, comprising the following steps:

In step (1), a glass core column with a driving chip and a resistor is automatically manufactured, comprising: successively placing a glass horn tube, a first conducting wire, a second conducting wire with the driving chip and a resistor element, and a vent tube, which are required for manufacturing the glass core column, into a firing mold of a multi-station automatic rotating machine, enabling an upper end of each of the glass horn tube and the vent tube, with the first conducting wire, and the second conducting wire with the driving chip and the resistor, to be fused and pressed into a flat shape by using a low to high temperature flame, and then allowing the glass core column to move to a conveying device by using an automatic clamping manipulator to convey the glass core column to the next procedure.

In step (2), an LED filament is automatically welded, comprising: fixing the LED filament between the first conducting wire and the second conducting wire by using an automatic welding machine, such that the LED filament and the glass core column together form an LED wick, and then automatically conveying the LED wick to a sealing and venting machine.

In step (3), automatic sealing and venting of a lamp cover and the wick and gas protection are performed, comprising: enabling the LED wick to pass into the lamp cover from a lower opening of the lamp cover, and heating and fusion-bonding the lower opening of the lamp cover with a high temperature flame, such that the lower opening of the lamp cover and the glass core column are fusion-bonded into a whole to form an LED bulb body; and vacuumizing the LED bulb body by using a vacuum venting device, then injecting an inert gas into same via the vent tube, heating the vent tube with a high temperature flame to fuse and seal the vent tube so as to form a rough LED bulb, and then conveying the rough LED bulb to an automatic socket machine.

In step (4), a lamp holder is automatically installed, comprising: conducting a power-on test on the rough LED bulb to automatically recognize defective products, installing, on the lamp holder, the rough LED bulb that can normally emit light, heating at a high temperature, such that glue in the lamp holder is cured with the lamp holder, and then automatically welding tin points of positive and negative electrodes to form a finished LED bulb.

In step (5), automatic testing and packaging are performed, comprising: conducting a power-on test on the finished LED bulb, and allowing the bulb to enter a product packaging line if it can normally emit light, so as to complete the production of the LED bulb.

Further, automatic clamping manipulators and conveying devices for moving products may be installed between the procedures, and a product fixture which is required for the corresponding procedure may be installed on the conveying device.

Further, the glass horn tube, the first conducting wire, the second conducting wire with the driving chip and the resistor element, and the vent tube may be respectively placed in an automatic feeding device. The multi-station automatic rotating machine performs a cyclic rotation movement, and when the multi-station automatic rotating machine moves by one station, the automatic feeding device corresponding to the firing mold automatically drops a fitting part.

Further, in step (2), before welding the LED filament, further comprised may be a step of straightening and cutting the first conducting wire and the second conducting wire, in which the glass core column is vertically fixed to a moving welding position, and the upper end of the glass core column is shaped by several corresponding positioning parts, such that the first conducting wire and the second conducting wire are kept upright to ensure that the LED filament is welded accurately and firmly, so as to be welded into the wick.

Further, in step (3), the fusion-bonding process of the lamp cover and the wick may successively comprise a pre-sintering step, a high temperature sintering step and an annealing sintering step, and the flame intensity in the pre-sintering step and the annealing sintering step is less than the flame intensity in the high temperature sintering step.

Further, in step (4), when a rough LED bulb is conveyed to a lamp holder installation machine, the rough LED bulb may be firstly placed upside down, such that the lower ends of the first conducting wire and the second conducting wire face upward; and the rough LED bulb is then horizontally moved and is prepared before the lamp holder is installed, with the specific operations in a sequence being as follows:

A. a bottom guide wire of the rough LED bulb is straightened by brushing using a brush wheel;

B. the first conducting wire and the second conducting wire are straightened using two correspondingly installed brush wheels;

C. the first conducting wire and the second conducting wire are separated from one another using a shifter lever, with the first conducting wire acting as a negative electrode and the second conducting wire acting as a positive electrode, wherein the lower end of the first conducting wire is bent downward by the shifter lever to get close to the rough LED bulb;

D. the second conducting wire is straightened upward using a pneumatic clamp;

E. the rough LED bulb is powered on to test the quality of the LED wick;

F. if it is detected, in the last station, that the LED wick does not emit light, the rough LED bulb is blown into a defective product collection box using a high pressure nozzle, and if the LED wick can normally emit light, the LED wick further moves to the next station;

G. the lamp holder is covered using the automatic clamping manipulator, and the products are then delivered into the respective positioning molds for fixation, the excess portions at the lower ends of the first conducting wire and the second conducting wire are cut off, automatic tin soldering is then performed to form finished LED bulbs, and the finished LED bulbs are then automatically conveyed to an optical testing machine for sorting;

I. if it is detected, in the last station, that the finished LED bulb does not emit light, the defective LED bulb is blown into a defective product collection box using a high-pressure nozzle, and if the finished LED bulb can normally emit light, the finished LED bulb further moves to the next station; and J. the lamp holder of the finished LED bulb is fixed using a high temperature flame.

Further, an inner wall of the lamp holder may be provided with a hot melt adhesive, and by heating the lamp holder by spraying same with a high temperature flame, the lamp holder is attached and fixed to the rough LED bulb to complete the installation of the lamp holder.

Further, an LED light-emitting sensor may be installed next to a test station during the power-on test; and if the LED light-emitting sensor does not sense the light, an instruction may be sent to control the blowing of the high-pressure nozzle.

Preferably, the driving chip and the resistor element of the second conducting wire are pre-fired into an electronic element, and the electronic element is located at the top end of the core column or on an inner side of the glass horn tube.

The present invention has the following beneficial effects:

In the automatic production process of LED bulbs provided by the present invention, the conducting wire with the driving chip and the resistor element is integrated with the glass core column which is required for the bulb, and the filament is welded by the automatic welding machine to form a complete wick which is required for an LED bulb. The LED wick is conveyed into the automatic sealing and venting machine via the automatic clamping manipulator, the conveying device, etc., and after the inert gas is filled into same, the vent tube is cut off to form a rough LED bulb. With the cooperation and arrangement of automatic equipment in the procedures, the automatic process of installing the rough LED bulb with the lamp holder is achieved, thus greatly improving the production efficiency, reducing the labor cost of production, and realizing the fast, efficient and high-quality production of LED bulbs; and as the automatic production is a substitute for the manual production with an uncertainty cost and quality, continuous all-day production without interruptions is realized, the labor cost of production is greatly reduced, and the production efficiency and quality are improved.

DETAILED DESCRIPTION OF PREFERRED EMBODIMENTS OF THE INVENTION

To facilitate the understanding of those skilled in the art, the present invention will be further described below in conjunction with the accompanying drawings and embodiments, and the contents mentioned in the embodiments are not intended to limit the present invention. The present invention will be described in detail in conjunction with the accompanying drawings.

Figure 1:
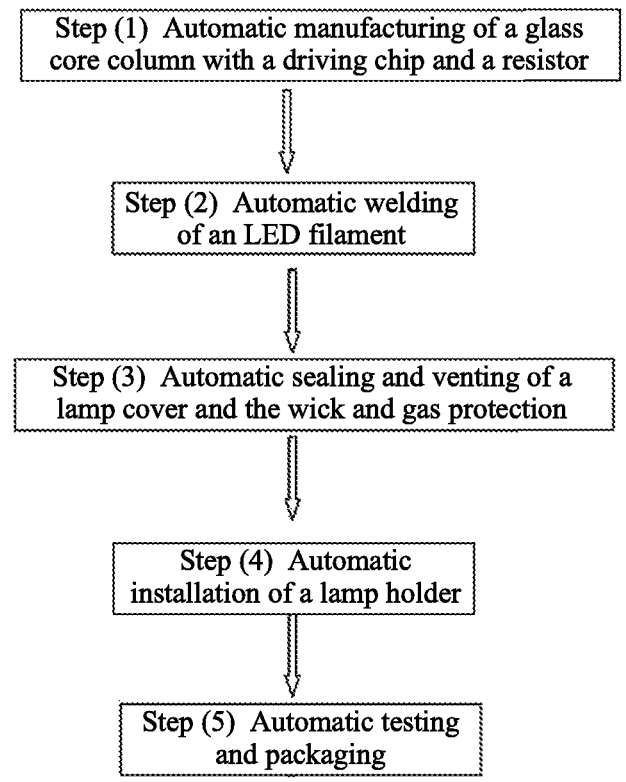
FIG. 1 is a process flowchart of an automatic production process of LED bulbs according to an embodiment of the present invention.
Figure 2:
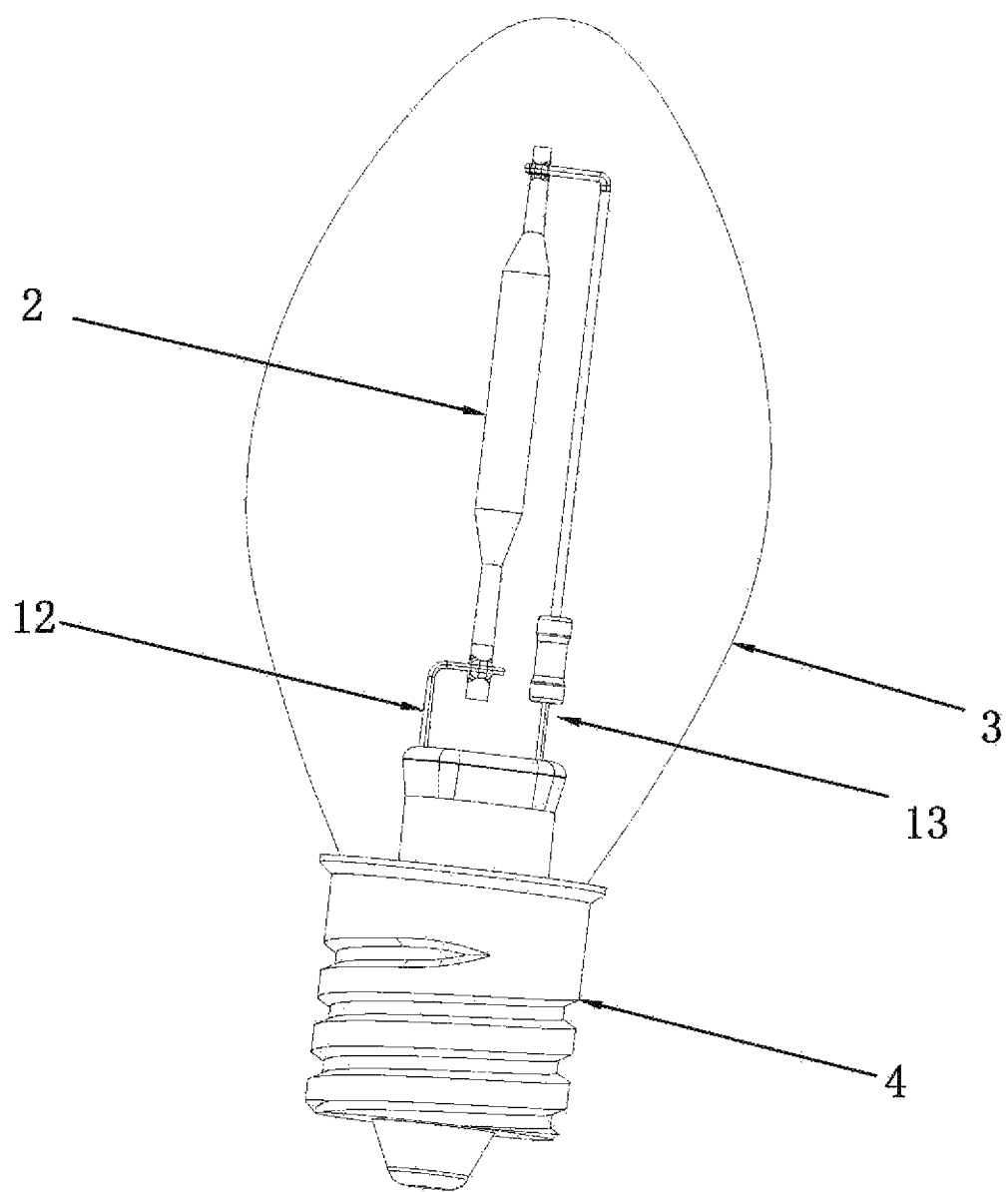
FIG. 2 is a structural schematic diagram of an LED wick according to an embodiment of the present invention.
Figure 3:
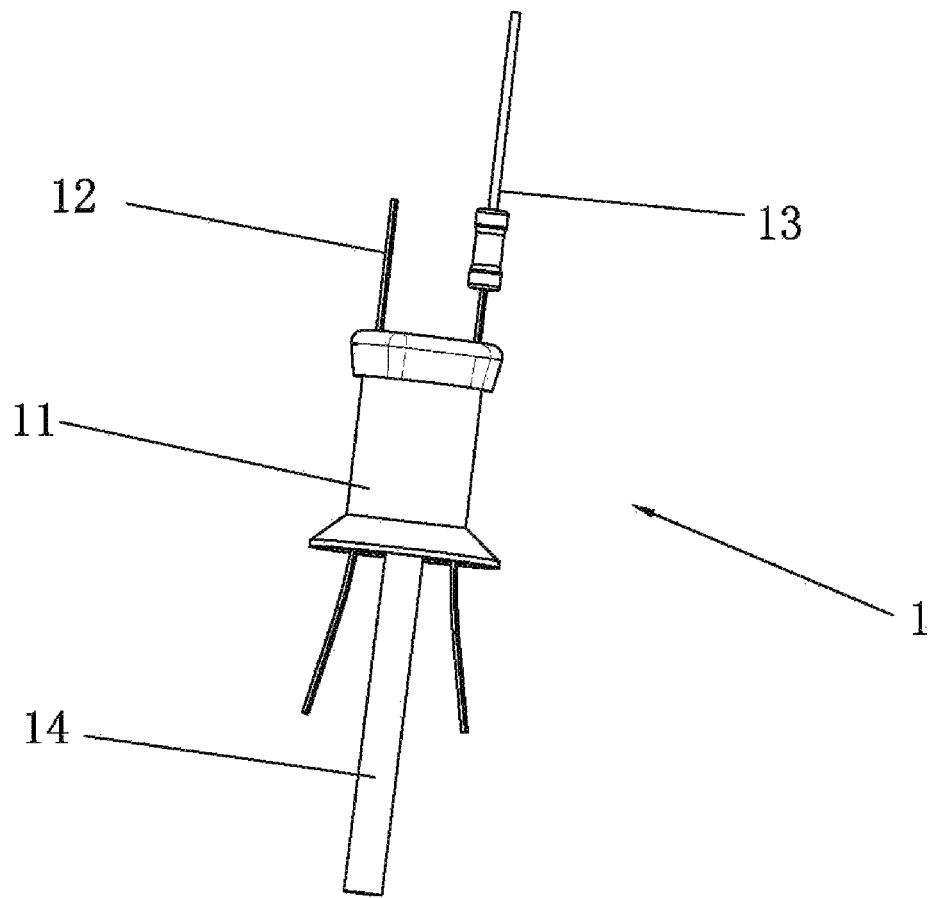
FIG. 3 is a structural schematic diagram of the LED bulb according to an embodiment of the present invention.

The reference numerals in FIGS. 1-3 include:
1—Glass core column
11—Glass horn tube
12—First conducting wire;
13—Second conducting wire
14—Vent tube;
2—LED filament
3—Lamp cover
4—Lamp holder.

An automatic production process of LED bulbs provided by the present invention comprises the following steps:

In step (1), a glass core column 1 with a driving chip and a resistor is automatically manufactured, comprising: successively placing a glass horn tube 11, a first conducting wire 12, a second conducting wire 13 with the driving chip and a resistor element, and a vent tube 14, which are required for manufacturing the glass core column, into a firing mold of a multi-station automatic rotating machine, enabling an upper end of each of the glass horn tube 11 and the vent tube 14, with the first conducting wire 12, and the second conducting wire 13, with the driving chip and the resistor, to be fused and pressed into a flat shape by using a low to high temperature flame, and then allowing the glass core column 1 to move to a conveying device by using an automatic clamping manipulator to convey the glass core column to the next procedure. The glass core column 1 is an inner core of an LED bulb and is used for supporting and installing an LED filament, and the automatic production process starts from the production and manufacturing of the inner core; and the second conducting wire 13 disclosed in the present invention is prefabricated from a wire, the driving chip and the resistor element to form an integral conducting wire, without manually welding the driving chip and the resistor element, thus reducing the manual procedures of manually welding the electronic element by multiple people, improving the production efficiency of follow-up installation of the lamp holder, and reducing the cost of manually installing the lamp holder by multiple people. Therefore, the glass horn tube 11, the first conducting wire 12, the second conducting wire 13 and the vent tube 14 can achieve automatic production using production equipment. During production, only one worker needs to be responsible for the management and control of the equipment for automatically manufacturing the glass core column 1, and according to current actual production calculations, 30-40 glass core columns 1 can be produced every minute, which greatly improves the production efficiency and reduces the labor cost of production.

In step (2), an LED filament 2 is automatically welded, comprising: fixing the LED filament 2 between the first conducting wire 12 and the second conducting wire 13 with the driving chip and the resistor element by using an automatic welding machine, such that the LED filament 2 and the glass core column 1 together form an LED wick, and then automatically conveying the LED wick to a sealing and venting machine. The LED filament 2 is a straight bar-shaped light-emitting body, wherein solid welding only needs to be performed on two ends of the LED filament 2, and fast welding can be achieved using the automatic welding machine. During welding, only one worker needs to be responsible for the management and control of the automatic welding machine, and 30-40 LED filaments 2 can be welded and fixed every minute, which can greatly improve the production efficiency and reduce the labor cost of production as compared with the traditional manual welding.

In step (3), automatic sealing and venting of a lamp cover and the wick and gas protection are performed, comprising: at the sealing and venting machine, firstly enabling the LED wick to pass into the lamp cover 3 from a lower opening of the lamp cover 3, heating and fusion-bonding the lower opening of the lamp cover 3 by using a high temperature flame, such that the lower opening of the lamp cover 3 and the glass core column 1 are fusion-bonded into a whole to form an LED bulb body; and then vacuumizing the LED bulb body by using a vacuum venting device, then injecting an inert gas into same via the vent tube 14, heating the vent tube 14 with a high temperature flame to fuse and seal the vent tube so as to form a rough LED bulb, and then conveying the rough LED bulb to an automatic socket machine.

In step (4), a lamp holder 4 is automatically installed, comprising: conducting a power-on test on the rough LED bulb to automatically recognize defective products, installing, on the lamp holder 4, the rough LED bulb that can normally emit light, heating at a high temperature, such that glue in the lamp holder is cured with the lamp holder 4, and then automatically welding tin points of positive and negative electrodes to form a finished LED bulb.

In step (5), automatic testing and packaging are performed, comprising: conducting a power-on test on the finished LED bulb, and allowing the bulb to enter a product packaging line if it can normally emit light, so as to complete the production of the LED bulb.

With the above-mentioned five steps, in the present invention, the conducting wire with the driving chip and the resistor element is integrated with the glass core column which is required for the bulb, and the filament is welded by the automatic welding machine to form a complete wick which is required for an LED bulb. The LED wick is conveyed into the automatic sealing and venting machine via the automatic clamping manipulator, the conveying device, etc., and after the inert gas is filled into same, the vent tube 14 is cut off to form a rough LED bulb. With the cooperation and arrangement of automatic equipment in the procedures, the automatic process of installing the rough LED bulb with the lamp holder is achieved, thus greatly improving the production efficiency, reducing the labor cost of production, and realizing the fast, efficient and high-quality production of LED bulbs; and as the automatic production is a substitute for the manual production with an uncertain cost and quality, continuous all-day production without interruptions is realized, the labor cost of production is greatly reduced, and the production efficiency and quality are improved.

In the present invention, automatic clamping manipulators and the conveying devices for moving products are installed between the procedures, and a product fixture which is required for the corresponding procedure is installed on the conveying device. The present invention achieves automatic operation between the procedures by replacing manual handling with the automatic clamping manipulators and the conveying devices.

Further, the glass horn tube 11, the first conducting wire 12, the second conducting wire 13, and the vent tube 14 are respectively placed in an automatic feeding device, the multi-station automatic rotating machine performs a cyclic rotation movement, and when the multi-station automatic rotating machine moves by one station, the automatic feeding device corresponding to the firing mold automatically drops a fitting part.

Further, in step (2), before welding the LED filament 2, further comprised is the step of straightening and cutting the first conducting wire 12 and the second conducting wire 13, in which the glass core column 1 is vertically fixed to a moving welding position; and the upper end of the glass core column is shaped by several corresponding positioning parts, such that the first conducting wire 12 and the second conducting wire 13 are kept upright to ensure that the LED filament is welded accurately and firmly, so as to be welded into the wick. Since the first conducting wire 12 and the second conducting wire 13 may not be upright when they are fixed to the glass core column 1, the upper end of the glass core column 1 is shaped by the positioning parts, and the first conducting wire 12 and the second conducting wire 13 are kept upright by means of a brush wheel, such that the two ends of the LED filament 2 can be in full contact with the first conducting wire 12 and the second conducting wire 13.

Further, the fusion-bonding process of the lamp cover and the wick successively comprises a pre-sintering step, a high temperature sintering step and an annealing sintering step, and the flame intensity in the pre-sintering step and the annealing sintering step is less than the flame intensity in the high temperature sintering step.

Further, in step (4), when a rough LED bulb is conveyed to a lamp holder installation machine, the rough LED bulb is firstly placed upside down, such that the lower ends of the first conducting wire and the second conducting wire face upward; and then the rough LED bulb is horizontally moved and is prepared before the lamp holder is installed, with the specific operations in the sequence being as follows:

A. a bottom guide wire of the rough LED bulb is straightened by brushing using a brush wheel;

B. the first conducting wire 12 and the second conducting wire 13 are straightened again using the two correspondingly installed brush wheels;

C. the first conducting wire 12 and the second conducting wire 13 are separated from one another using a shifter lever, with the first conducting wire 12 acting as a negative electrode and the second conducting wire 13 acting as a positive electrode, wherein the lower end of the first conducting wire 12 is bent downward by the shifter lever to get close to the rough LED bulb;

D. the second conducting wire 13 is straightened upward using a pneumatic clamp;

E. the rough LED bulb is powered on to test the quality of the LED wick;

F. if it is detected, in the last station, that the LED wick does not emit light, the rough LED bulb is blown into a defective product collection box using a high pressure nozzle, and if the LED wick can normally emit light, the LED wick further moves to the next station;

G. the lamp holder 4 is covered using the automatic clamping manipulator, and the products are then delivered into the respective positioning molds for fixation, the excess portions at the lower ends of the first conducting wire 12 and the second conducting wire 13 are cut off, automatic tin soldering is then performed to form finished LED bulbs, and the finished LED bulbs are then automatically conveyed to an optical testing machine for sorting;

I. if it is detected, in the last station, that the finished LED bulb does not emit light, the defective LED bulb is blown into a defective product collection box using a high-pressure nozzle, and if the finished LED bulb can normally emit light, the finished LED bulb further moves to the next station; and J. the lamp holder 4 of the finished LED bulb is fixed using a high temperature flame.

Furthermore, an inner wall of the lamp holder 4 is provided with a hot melt adhesive, and by heating the lamp holder 4 by spraying same with a high temperature flame, the lamp holder 4 is attached and fixed to the rough LED bulb to complete the installation of the lamp holder 4. Accurately installing the lamp holder 4 on the rough LED bulb is the key to whether the bulb can normally emit light. Since there are many steps in the installation of the lamp holder 4, the traditional manual installation of the lamp holder 4 requires at least 5-7 people to cooperate in flow line production, and the manual installation of the lamp holder 4 not only causes low efficiency, but also has too large of an investment in terms of human capital. With the abovementioned automatic production process of automatic installation of the lamp holder 4, which can be a substitute the traditional production technology relying on manual operation, the production efficiency is greatly improved, the labor costs are saved, and at the same time, the produced finished LED bulbs have a stable quality.

Further, an LED light-emitting sensor is installed next to a test station during the power-on test; and if the LED light-emitting sensor does not sense the light, an instruction is sent to control the blowing of the high-pressure nozzle. The automatic removal of defective products is realized by means of the sensing light from the LED light-emitting sensor.

Preferably, the driving chip and the resistor element of the second conducting wire 13 are pre-fired into an electronic element, and the electronic element is located at the top end of the core column or on an inner side of the glass horn tube.

The foregoing is merely the preferred embodiments of the present invention and is not intended to limit the present invention in any way. While the present invention has been disclosed as above with reference to the preferred embodiments, these are not intended to limit the present invention. Any person skilled in the art can make use of the technical contents stated above to create equivalent embodiments using alterations or modifications which can be considered as equivalent variations, without departing from the scope of the technical solutions of the present invention. Any simple modifications, equivalent variations and modifications to the above embodiments in accordance with the technical essence of the present invention, without departing from the contents of the technical solutions of the present invention, are still within the scope of the technical solutions of the present invention.

What is claimed is:

1. An automatic process of making a LED bulb comprising:

step (1), automatically manufacturing a glass core column with a driving chip and a resistor, which comprises: successively placing a glass horn tube, a first conducting wire, a second conducting wire with the driving chip and a resistor element, and a vent tube into a firing mold of a multi-station automatic rotating machine, fusing and pressing an upper end of each of the glass horn tube and the vent tube, the first conducting wire, and the second conducting wire with the driving chip and the resistor into a flat shape via flames, and then moving the glass core column to a conveying device via an automatic clamping manipulator for conveying the glass core column to the next step;

step (2), automatically welding an LED filament, which comprises: fixing the LED filament between the first conducting wire and the second conducting wire by using an automatic welding machine, such that the LED filament and the glass core column together form an LED wick, and then automatically conveying the LED wick to a sealing and venting machine;

step (3), automatically sealing and venting of a lamp cover and the LED wick and gas protection, which comprises: passing the LED wick into the lamp cover from a lower opening of the lamp cover, and heating and fusion-bonding the lower opening of the lamp cover with a flame, such that the lower opening of the lamp cover and the glass core column are fusion-bonded into a whole to form an LED bulb body; and vacuumizing the LED bulb body by using a vacuum venting device, then injecting an inert gas into same via the vent tube, heating the vent tube with a flame to fuse and seal the vent tube so as to form a rough LED bulb, and then conveying the rough LED bulb to an automatic socket machine;

step (4), automatically installing a lamp holder, which comprises: conducting a power-on test on the rough LED bulb to automatically recognize a defective product, installing, on the lamp holder, the rough LED bulb that can normally emit light, heating such that glue in the lamp holder is cured with the lamp holder, and then automatically welding tin points of positive and negative electrodes to form a finished LED bulb; and step (5), automatically testing and packaging, which comprises: conducting a power-on test on the finished LED bulb, and allowing the LED bulb to enter a product packaging line if it can normally emit light, so as to complete the making of the LED bulb.

2. The automatic process of claim 1, wherein automatic clamping manipulators and conveying devices for moving products are installed between the steps, and a product fixture is installed on the conveying device.

3. The automatic process of claim 1, wherein the glass horn tube, the first conducting wire, the second conducting wire with the driving chip and the resistor element, and the vent tube are respectively placed in an automatic feeding device, the multi-station automatic rotating machine performs a cyclic rotation movement, and when the multi-station automatic rotating machine moves by one station, the automatic feeding device corresponding to the firing mold automatically drops a fitting part.

4. The automatic process of claim 1, wherein in step (2), before welding the LED filament, further comprised is a step of straightening and cutting the first conducting wire and the second conducting wire, in which the glass core column is vertically fixed to a moving welding position, and the upper end of the glass core column is shaped by several corresponding positioning parts, such that the first conducting wire and the second conducting wire are kept upright to ensure that the LED filament is welded accurately and firmly, so as to be welded into the LED wick.

5. The automatic process of claim 1, wherein in step (3), the fusion-bonding process of the lamp cover and the LED wick successively comprises a pre-sintering step, a sintering step and an annealing sintering step, and the flame intensity in the pre-sintering step and the annealing sintering step is less than the flame intensity in the sintering step.

6. The automatic process of claim 1, wherein in step (4), when a rough LED bulb is conveyed to a lamp holder installation machine, the rough LED bulb is firstly placed upside down, such that the lower ends of the first conducting wire and the second conducting wire face upward; and the rough LED bulb is then horizontally moved and is prepared before the lamp holder is installed, with the specific operations in the sequence being as follows:
  A. a bottom guide wire of the rough LED bulb is straightened by brushing using a brush wheel;
  B. the first conducting wire and the second conducting wire are straightened using two correspondingly installed brush wheels;
  C. the first conducting wire and the second conducting wire are separated from one another using a shifter lever, with the first conducting wire acting as a negative electrode and the second conducting wire acting as a positive electrode, wherein the lower end of the first conducting wire is bent downward by the shifter lever to get close to the rough LED bulb;
  D. the second conducting wire is straightened upward using a pneumatic clamp;
  E. the rough LED bulb is powered on to test the quality of the LED wick;
  F. if it is detected, in the last station, that the LED wick does not emit light, the rough LED bulb is blown into a defective product collection box using a nozzle, and if the LED wick can normally emit light, the LED wick further moves to the next station;
  G. the lamp holder is covered using the automatic clamping manipulator, and the products are then delivered into the respective positioning molds for fixation, the excess portions at the lower ends of the first conducting wire and the second conducting wire are cut off, automatic tin soldering is then performed to form finished LED bulbs, and the finished LED bulbs are then automatically conveyed to an optical testing machine for sorting;
  H. if it is detected, in the last station, that the finished LED bulb does not emit light, the defective LED bulb is blown into a defective product collection box using a nozzle, and if the finished LED bulb can normally emit light, the finished LED bulb further moves to the next station; and
  I. the lamp holder of the finished LED bulb is fixed using a flame.

7. The automatic process of claim 6, wherein an inner wall of the lamp holder is provided with a hot melt adhesive, and by heating the lamp holder by spraying same with a flame, the lamp holder is attached and fixed to the rough LED bulb to complete the installation of the lamp holder.

8. The automatic process of claim 1, wherein an LED light-emitting sensor is installed next to a test station during the power-on test; and if the LED light-emitting sensor does not sense the light, an instruction is sent to control the blowing of the nozzle.

9. The automatic process of claim 1, wherein the driving chip and the resistor element of the second conducting wire are pre-fired into an electronic element, and the electronic element is located at the top end of the core column or on an inner side of the glass horn tube.

* * * * *